H. F. SALGE.
PLOW.
APPLICATION FILED JUNE 5, 1913.
1,093,294.  Patented Apr. 14, 1914.
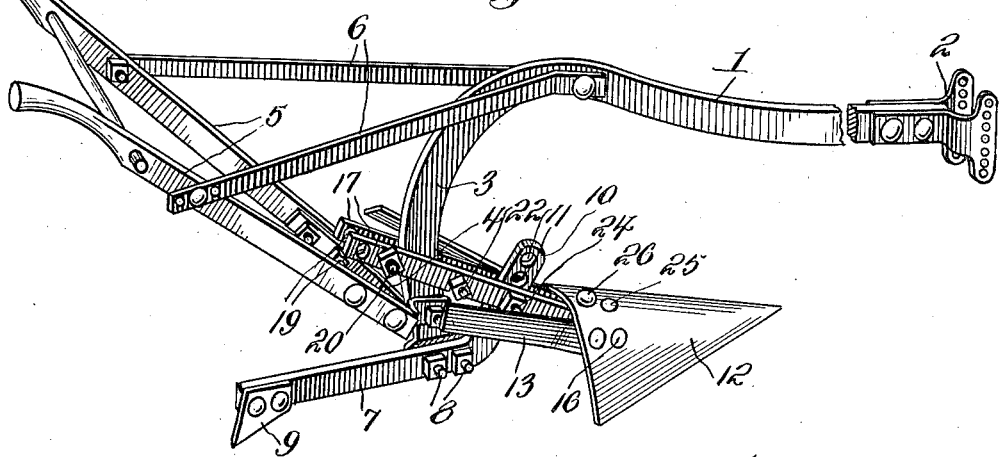

UNITED STATES PATENT OFFICE.

HENRY F. SALGE, OF LOCKHART, TEXAS.

PLOW.

1,093,294.

Specification of Letters Patent. Patented Apr. 14, 1914.

Application filed June 5, 1913. Serial No. 771,943.

*To all whom it may concern:*

Be it known that I, HENRY F. SALGE, a citizen of the United States, residing at Lockhart, in the county of Caldwell and State of Texas, have invented certain new and useful Improvements in Plows, of which the following is a specification.

This invention relates to plows, and its object is to provide a plow which is light, strong, durable, rigid and inexpensive in construction, adapted for general cultivating and hilling work to effectually hill the soil about the plants, which is firm and steady in operation and adapted to be easily handled, and which admits of the use of a variety of sizes of plow points or shares and the ready adjustment of the same to a desired angle of inclination.

The invention consists of the features of construction, combination and arrangement of parts hereinafter fully described and claimed, reference being had to the accompanying drawing, in which:—

Figure 1 is a perspective view of my improved plow. Fig. 2 is a horizontal section on the line 2—2 of Fig. 1. Fig. 3 is a vertical section on the line 3—3 of Fig. 2. Fig. 4 is a detail bottom plan view of the share and shank. Fig. 5 is a detail perspective view, showing the parts detached.

Referring to the drawing, 1 designates the beam of the plow, having at its forward end a draft clevis 2 and at its rear end a downturned standard 3. To the standard are bolted or otherwise secured brackets 4, to which are attached the handles 5 reinforced from the beam by braces 6.

A longitudinally extending supporting bar 7 is secured to the lower end of the standard by bolts or other suitable fastenings 8, and said bar extends mainly in rear of the standard and carries at its rear end a guide blade or runner 9, preferably of a self-sharpening type and adapted to penetrate the earth to guide the plow firmly against lateral deflection in its intended course. The forward end of the bar 7 is bent upwardly and forwardly to provide a bracket arm 10 having a series of openings 11 therein.

The plow point or share 12 carries at its opposite sides wings 13 which operate to guide the turned earth laterally and effectually hill the soil around the plants. These wings are detachably and adjustably secured to the share, the lower end of each wing being mounted upon a pivot bolt and provided with holes 15 through which extends a securing bolt 16, the holes in the wings permitting the same to be adjusted laterally to regulate the distribution of the soil.

The plow point or share is carried by a looped shank composed of a pair of parallel bars 17 connected at their forward ends by a return bend or portion 18. The shank projects at a downward and forward angle and the bars 17 straddle or lie on opposite sides of the standard 3 and bracket arm 10. The rear ends of the bar 17 are provided with openings 19 for the passage of a connecting bolt 20 coupling said bars in rear of the standard, and immediately in advance of the standard the bars are provided with an opening 21 for the passage of a coupling bolt 22, the bolts 20 and 22 serving to clamp the shank to the standard in such manner as to permit the shank to be adjusted vertically to different elevations on the standard, as will be readily understood.

At the point where the bars 17 extend across the bracket arm 10, said bars are provided with openings 23 for the passage of a bolt 24 which bolt also extends through one of the openings 11 in the arm 10 and rigidly fastens the shank thereto at a point in advance of the standard, thus firmly connecting the standard, supporting bar and plow point or share, to provide a rigid, strong and durable construction. This mode of connecting the shank with the bracket arm 10 also adapts said shank to be adjusted to lie at different angles of inclination, so that the plow point may be held at different working angles.

The point or share rests upon the forward end of the shank and is provided with a depending lug 25 of oval or elliptical form which extends down between the bars of the shank and holds the point or share from forward or lateral shifting movements. A bolt 26 extends downward through the share and between the shank bars and is provided with a clamping washer 27 and nut 28, whereby the share is fastened in position.

It will be seen from the foregoing description that the invention provides a simple, and yet firm and secure mode of fastening the plow share in position and firmly and rigidly securing the same to the standard and supporting bar, the construction being such as to secure lightness of weight with absolute rigidity, the advantages of which will be appreciated. It will also be seen that the construction described adapts the plow point or share to be adjustably mounted in a simple manner without complication of parts, and that the structure as a whole provides a plow which will efficiently perform its intended functions.

I claim:—

1. A plow including a beam carrying a standard, a longitudinally-extending supporting bar secured to the standard and having an up-turned forward end, a shank connected with the up-turned end of the bar for longitudinal and vertical adjustments, and a plow point or share adjustably secured to the forward end of the shank.

2. A plow including a beam having a depending standard, a longitudinally-extending supporting bar secured to the lower end of the standard, said bar having an up-turned forward end, a guide runner upon the rear end of the bar, a shank composed of spaced members connected at their forward ends, said members being arranged to embrace the standard and up-turned end of the bar, fastening devices connecting the shank with the standard and up-turned end of the bar for longitudinal and vertical adjustments, and a plow point or share adjustably connected with the forward end of the shank.

3. A plow including a beam having a depending standard, a longitudinally-extending supporting bar secured to the lower end of the standard, said bar having its forward end projecting upward at an angle to form a bracket arm, a guide runner carried by the rear end of the supporting bar, a shank composed of spaced members arranged to embrace the standard and bracket arm and connected at their forward ends, fastening devices connecting the shank with the standard and bracket arm for longitudinal and vertical adjustments, a plow point or share resting upon the forward end of the shank, a stop lug carried thereby and fitting between the members of the shank and abutting against the forward end thereof, and a bolt passing through the plow point or share and between the members of the shank and adjustably securing said plow point or share to the shank.

In testimony whereof I affix my signature in presence of two witnesses.

HENRY F. SALGE.

Witnesses:
FRANK S. ROBERTS,
WM. WESEAN.